United States Patent [19]

Houska

[11] Patent Number: 5,068,954

[45] Date of Patent: Dec. 3, 1991

[54] DART SHAFT EXTRACTION TOOL

[76] Inventor: Robert L. Houska, P.O. Box 20161, St. Louis, Mo. 63123

[21] Appl. No.: 581,036

[22] Filed: Sep. 12, 1990

[51] Int. Cl.[5] .............................................. B23P 19/06

[52] U.S. Cl. ...................................................... 29/240

[58] Field of Search ......................... 29/240, 401, 427; 908/224, 230; 81/53.2, 441, 438

[56] References Cited

U.S. PATENT DOCUMENTS

| | | | |
|---|---|---|---|
| 1,093,252 | 4/1914 | Carnes . | |
| 1,458,076 | 6/1923 | Potts | 81/53.2 |
| 1,547,944 | 7/1925 | Murphree . | |
| 1,549,041 | 8/1925 | Berg . | |
| 2,121,197 | 6/1938 | Jackman | 81/441 |
| 2,686,447 | 8/1954 | Vock et al. | 29/240 |
| 3,216,292 | 11/1965 | Flegal | 81/53.2 |
| 3,654,690 | 4/1972 | Hardin | 29/240 |
| 3,727,491 | 4/1973 | Buckwalter | 81/53.2 |
| 3,862,516 | 1/1975 | Broscoff et al. . | |
| 4,787,278 | 11/1988 | Bononi | 81/438 |
| 4,831,902 | 5/1989 | McClure . | |

*Primary Examiner*—Robert C. Watson
*Attorney, Agent, or Firm*—Heller & Kepler

[57] ABSTRACT

A tool for extracting a broken flight support shaft from inside a threaded barrel of a dart assembly, has an extraction bit contained within an associated handle. The handle defines a dart barrel assembly receiving bore for guiding the dart barrel into contact with the extraction bit and associated extraction securing points.

20 Claims, 1 Drawing Sheet

DART SHAFT EXTRACTION TOOL

BACKGROUND OF THE INVENTION

The present invention relates in general to removing a broken shaft from a threaded holder and pertains, more particularly, to a tool for extracting a broken flight support shaft from a threaded barrel of a dart assembly. The tool of this invention provides an improvement over the conventional methods used to remove the threaded stubs of broken shafts.

With the conventional dart assembly, a barrel usually of metal has opposing ends. A point is press fitted and or glued or threaded into one end of the barrel. A flight support shaft is typically threaded into the opposite end of the barrel. The conventional shaft is plastic or any other suitable lightweight material having sufficient strength to support the flight and withstand the impact associated with conventional dart games of skill.

As will be appreciated by those familiar with higher level of play and competition, the dart barrels and other members are often imported or special order and their value can be substantial, particularly when a player may have multiple sets of darts.

The plastic shaft is subject to breakage due to the impact of other darts or from dropping and breaking if the dart does not stick in a dart board when thrown. If the broken off piece or stub of the shaft remaining in the barrel cannot be extracted, then the player has lost use of the dart until it can be repaired.

Another drawback associated with the conventional shafts is that they tend to break at flush or below flush near the end of the dart barrel without leaving enough of the shaft extending out of the barrel to get a purchase on in order to remove this broken shaft stub and insert a new or replacement shaft. Existing dart barrels also have a drawback related to their size, they are usually so small that the player does not have a tool readily available to remove or extract the shaft stub.

It has been observed that a player will attempt to extract the broken stub with a pocket knife or the point of another dart, either method provides the opportunity for the knife or the point of the dart to slip off of the broken shaft stub into ones hand or fingers. Darts are used by a particular player and are not often shared between players, particularly at competitive levels of tournament play. As a result, players will bring extra darts to a competition, thus requiring an often substantial investment in additional darts.

SUMMARY OF THE INVENTION

Accordingly, it is an object of the present invention to provide an improved shaft extraction tool that is adapted for insertion over an exposed end of a broken dart shaft member. With the extraction tool of this invention it has been found that the broken shaft stub can be removed by rotating the extraction tool to un-thread the shaft stub without damaging the dart barrel.

Another object of the present invention is to provide an improved shaft extraction tool that is constructed to provide a hand held tool that can be held in one hand while a dart barrel is held in the other and inserted into the extraction tool. The extraction tool has a handle and a point arrangement for readily receiving the dart barrel and inserting extraction means into the exposed end of the broken shaft stub without damage to the barrel.

A further object of the present invention is to provide a shaft extraction tool that is adapted for ease of use, safety, storage, and portability.

Still another object of the present invention is to provide a shaft extraction tool that allows a player to repair a broken dart without the need for additional tools or professional repair assistance.

To accomplish the foregoing and other objects of this invention there is provided a shaft extraction tool for extracting broken shafts from dart barrels to prepare the barrel for receiving another unbroken shaft in order that the player can continue to play with the dart.

The dart shaft extraction tool comprises receiving means for receiving a dart barrel and securing means for securing the extraction tool into a broken shaft portion remaining in the dart barrel and associated holding means for holding the securing means while the tool is rotated and the shaft portion extracted from the barrel.

In a preferred embodiment a tool bit defines multi-tapered wedge and point surfaces for facilitating insertion of the securing means into the shaft. A handle member receives the extraction bit in a suitable and complementary bore defined by the handle.

These and other objects and features of the present invention will be better understood and appreciated from the following detailed description of one embodiment thereof, selected for purposes of illustration and shown in the accompanying drawing.

DETAILED DESCRIPTION

Figure 1:
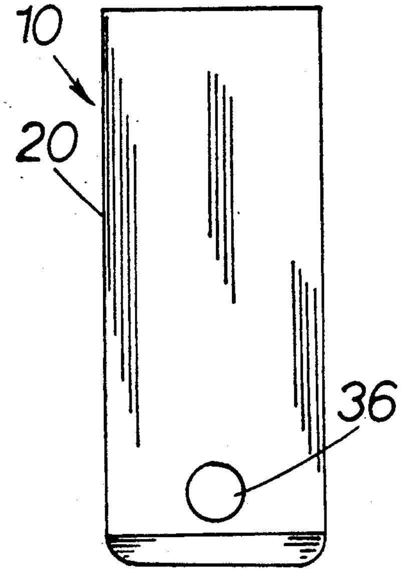
FIG. 1 is an elevation view of an extraction tool constructed in accordance with the present invention.

Referring now to the drawings there is shown a preferred embodiment for the extraction tool of this invention. The extraction tool is described in connection with a hand held or pocket size application to allow the ready removal or extraction of sheared shafts from a threaded barrel portion of a conventional dart assembly. The extraction tool of the present invention is particularly adapted for providing immediate dart repair and is characterized by an improved extraction device for returning darts to service with safety and without delay or cost.

The drawings show the extraction tool 10 in conjunction with a threaded dart barrel 12 of a conventional dart assembly in which their remains a broken shaft stub 14. The broken shaft, as is typically the case, has exposed only a surface 16 from which it is impractical or impossible to obtain sufficient purchase to readily remove the shaft stub 14.

The present invention includes an extraction means represented in the illustrated embodiment by an extraction bit 18 that is received by an extraction tool handle 20. The bit has an extraction bit shaft portion 22 and an extraction bit head or chisel portion 24. The chisel portion 24 defines a wedge or taper portion terminating in extraction points 26. Thus, a means is provided for securing entry into the exposed surface 16 and obtaining a purchase for securing the extraction bit into the shaft 14.

In the preferred embodiment the points 26 provide a securing means for securing the tool 10 in the shaft portion 14. The handle preferably incorporates gripping means to allow a user to firmly grip the extraction tool 10 for insertion of the securing means in the shaft surface 16 and rotating the extraction tool 10 to un-thread the shaft portion 14. This accomplished in a preferred embodiment with the incorporation of ridges and grooves into the outside surface of the extraction tool handle 20 as illustrated generally in FIG. 1.

The extraction tool handle 20 may include an opening 36 into which may be inserted a chain, ring, or the like for the convenience of the user and for carrying the extraction tool 10.

The handle member 20 defines and extraction bit receiving bore 38 having a plurality of faces generally inward facing and towards a central longitudinal axis of the tool 10. In a preferred embodiment the extraction bit 18 has generally complementary faces on the extraction bit shaft 22. A preferred embodiment of the extraction bit includes a base portion 42 may include a beveled edge with broken corners to facilitate insertion of the extraction bit 18 into the extraction handle 20 and receiving bore 38.

The extraction bit handle 20 may have a radius edges at its base to provide for more comfortable use of the tool 10.

Figure 2:
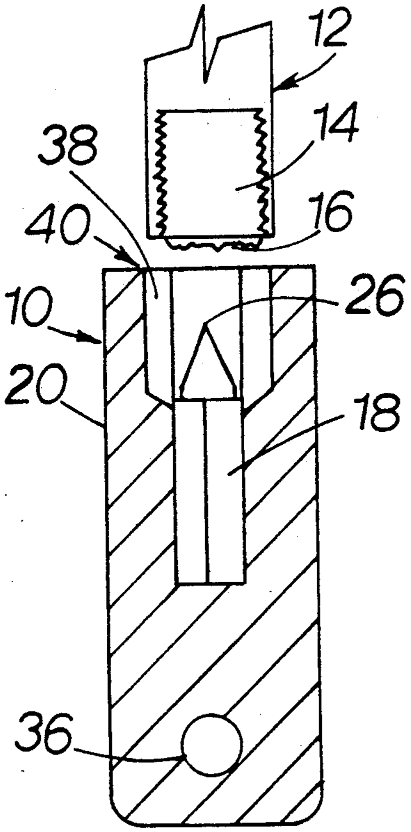
FIG. 2 is a cross-sectional view of a extraction tool handle taken along line 2—2 in FIG. 1 and depicting in a partially cut away view a dart barrel portion including a broken shaft still threaded into the barrel.
Figure 3:
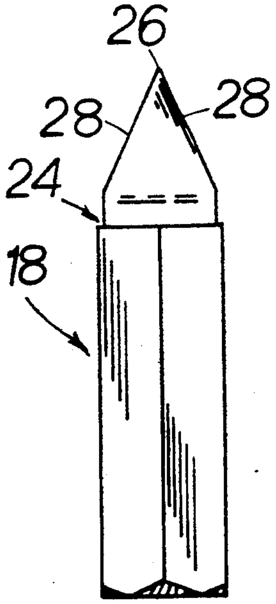
FIG. 3 is an elevation view of an extraction bit constructed in accordance with the present invention.
Figure 4:
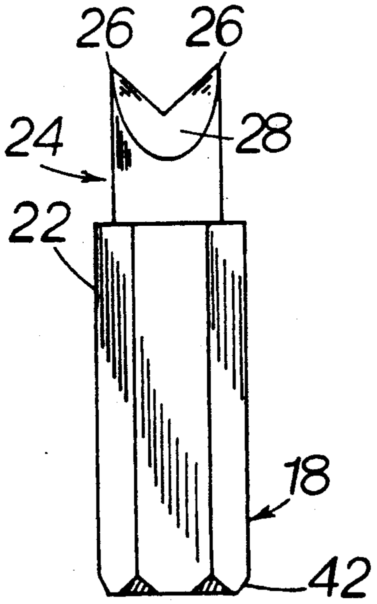
FIG. 4 is another elevation view of the extraction bit illustrated in FIG. 3.

In operation, in connection with the threaded barrel dart application previously mentioned to repair the dart for continued use, the tool 10 and the securing means or points in a preferred embodiment are secured or inserted into the shaft portion 14 as generally illustrated in FIG. 2. Once the points are secured, the tool 10 is turned until either the shaft portion 14 is completely removed or enough of the shaft is exposed to complete extraction by hand.

Figure 5:
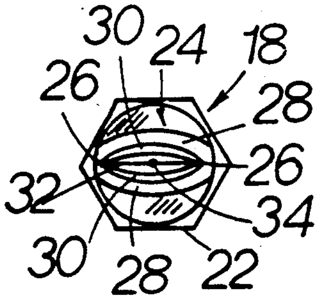
FIG. 5 is a top view of the extraction bit depicted in FIGS. 3 and 4 illustrating a plurality of inner and outer contoured surfaces associated with a pair of opposing point portions of the extraction bit of a preferred embodiment of the present invention.

In a preferred embodiment the extraction bit has two spaced points 26 and an outer wedge or taper portion 28 and an inner wedge or taper portion 30 as means for assisting securing of the points in the shaft stub 14. As illustrated in FIG. 5, there is an inner groove or channel 32 that extends between the points 26. A pilot bore 34 may be formed in the extraction bit in order to mill the bit as desired.

From the foregoing description those skilled in the art will appreciate that all of the objects of the present invention are realized. An dart shaft extraction tool has been shown and described for providing securing means for insertion into an exposed end of a broken dart shaft member and to extract the broken shaft stub by rotating the extraction tool to un-thread the shaft stub without damaging the dart barrel and with complete safety.

The extraction tool can be used easily by hand as soon as the shaft shears off in the dart barrel and without damage to the barrel. The dart shaft extraction tool is safe, easy to use, store, and transport to competitions and tournaments.

While specific embodiments have been shown and described, many variations are possible. The particular shape of the extraction tool bit or handle including all dimensions may be changed as desired to suit the equipment with which it is used. The handle and bit materials may vary although and extruded plastic and a 12L14 steel, respectively, are preferred.

The bevel or chisel configuration and the number of points may vary although the preferred embodiment shows two points. Also, in the embodiment described, the two points are located spaced apart at the periphery of the extraction bit head.

In a more simplified version of the invention, the bit and handle may be formed as a unitary device by casting or machining a suitable material.

Having described the invention in detail, those skilled in the art will appreciate that modifications may be made of the invention without departing from its spirit. Therefore, it is not intended that the scope of the invention be limited to the specific embodiment illustrated and described. Rather, it is intended that the scope of this invention be determined by the appended claims and their equivalents.

What is claimed is:

1. A dart shaft extraction tool, comprising:

receiving means for receiving a portion of a dart assembly containing a broken shaft portion to be extracted from the dart barrel, the receiving means defining a dart assembly receiving bore;

securing means for securing the broken shaft portion remaining in a dart barrel relative to the extraction tool, the dart barrel received by the dart assembly receiving bore defined by the receiving means, the securing means located within the dart assembly receiving bore defined by the receiving means; and holding means for holding the securing means while the tool is rotated and the shaft portion extracted from the barrel.

2. A dart shaft extraction tool as set forth in claim 1 wherein the securing means defines a tapered portion for facilitating insertion of the securing means into the shaft.

3. A dart shaft extraction tool as set forth in claim 2 wherein the tapered portion terminates in a plurality of pointed portions.

4. A dart shaft extraction tool as set forth in claim 3 wherein there are two pointed portions.

5. A dart shaft extraction tool as set forth in claim 1 wherein the securing means further comprises an extraction bit member.

6. A dart shaft extraction tool as set forth in claim 5 including a handle member defining the dart assembly receiving means.

7. A dart shaft extraction tool as set forth in claim 1 wherein the securing means and the holding means are defined by a unitary device.

8. A dart shaft extraction tool as set forth in claim 1 wherein the securing means and the holding means are provided by separate members, thereby forming an extraction tool assembly.

9. A dart shaft extraction tool, comprising:

an extraction bit portion;

a plurality of extraction bit points for securing the bit in a sheared off shaft portion remaining in a threaded barrel portion of a dart assembly, the points defined by an end of the extraction bit; and an extraction tool handle portion for holding the extraction bit, the handle portion defining a dart barrel receiving bore, whereby the dart barrel is guided into the dart extraction tool and into a securing engagement between the remaining shaft portion and the extraction bit points.

10. A dart shaft extraction tool as set forth in claim 9 wherein the extraction bit defines an outer wedge portion and an inner wedge portion facilitating entry of the extraction bit into the shaft stub.

11. A dart shaft extraction tool as set forth in claim 9 wherein there are two extraction bit points.

12. A dart shaft extraction tool as set forth in claim 9 wherein the securing means and the holding means are defined by a unitary device.

13. A dart shaft extraction tool as set forth in claim 9 wherein the extraction bit portion and the handle portion are provided by separate members, thereby forming an extraction tool assembly.

14. A dart shaft extraction tool, comprising:

an extraction bit member;

a pair of spaced apart extraction bit points for securing the bit in a sheared off shaft portion remaining in a threaded barrel portion of a dart assembly, the points defined by an end of the extraction bit;

the extraction bit member further defining a plurality of wedge portions to facilitate entry of the extraction bit member into the shaft stub;

an extraction tool handle portion for holding the extraction bit, the handle portion defining a dart barrel receiving bore and an extraction bit receiving bore, whereby the dart barrel is guided into the dart extraction tool and into a securing engagement between the remaining shaft portion and the extraction bit points associated with the extraction bit member received within the extraction bit receiving bore.

15. A dart shaft extraction tool as set forth in claim 14 wherein the extraction bit defines an outer wedge portion and an inner wedge portion facilitating entry of the extraction bit into the shaft stub and the inner and outer wedge portions define in inner point-to-point groove.

16. A dart shaft extraction tool as set forth in claim 14 wherein there are additional extraction bit points.

17. A dart shaft extraction tool as set forth in claim 14 wherein the securing means and the holding means are assembled to form a unitary device.

18. A dart shaft extraction tool as set forth in claim 14 wherein the handle is a extruded plastic.

19. A dart shaft extraction tool as set forth in claim 14 wherein the extraction bit is a tool-grade steel.

20. A dart shaft extraction tool, comprising:

an extraction bit member, the extraction bit member of a tool-grade steel;

a pair of spaced apart extraction bit points for securing the bit in a sheared off shaft portion remaining in a threaded barrel portion of a dart assembly, the points defined by an end of the extraction bit;

the extraction bit member further defining a plurality of wedge portions to facilitate entry of the extraction bit member into the shaft stub including an outer wedge portion and an inner wedge portion further facilitating entry of the extraction bit into the shaft stub, and the inner and outer wedge portions further defining an inner point-to-point groove; and an extraction tool handle portion for holding the extraction bit, the handle portion defining a dart barrel receiving bore and an extraction bit receiving bore, whereby the dart barrel is guided into the dart extraction tool and into a securing engagement between the remaining shaft portion and the extraction bit points associated with the extraction bit member received within the extraction bit receiving bore, the handle portion of an extruded plastic.

* * * * *